UNITED STATES PATENT OFFICE.

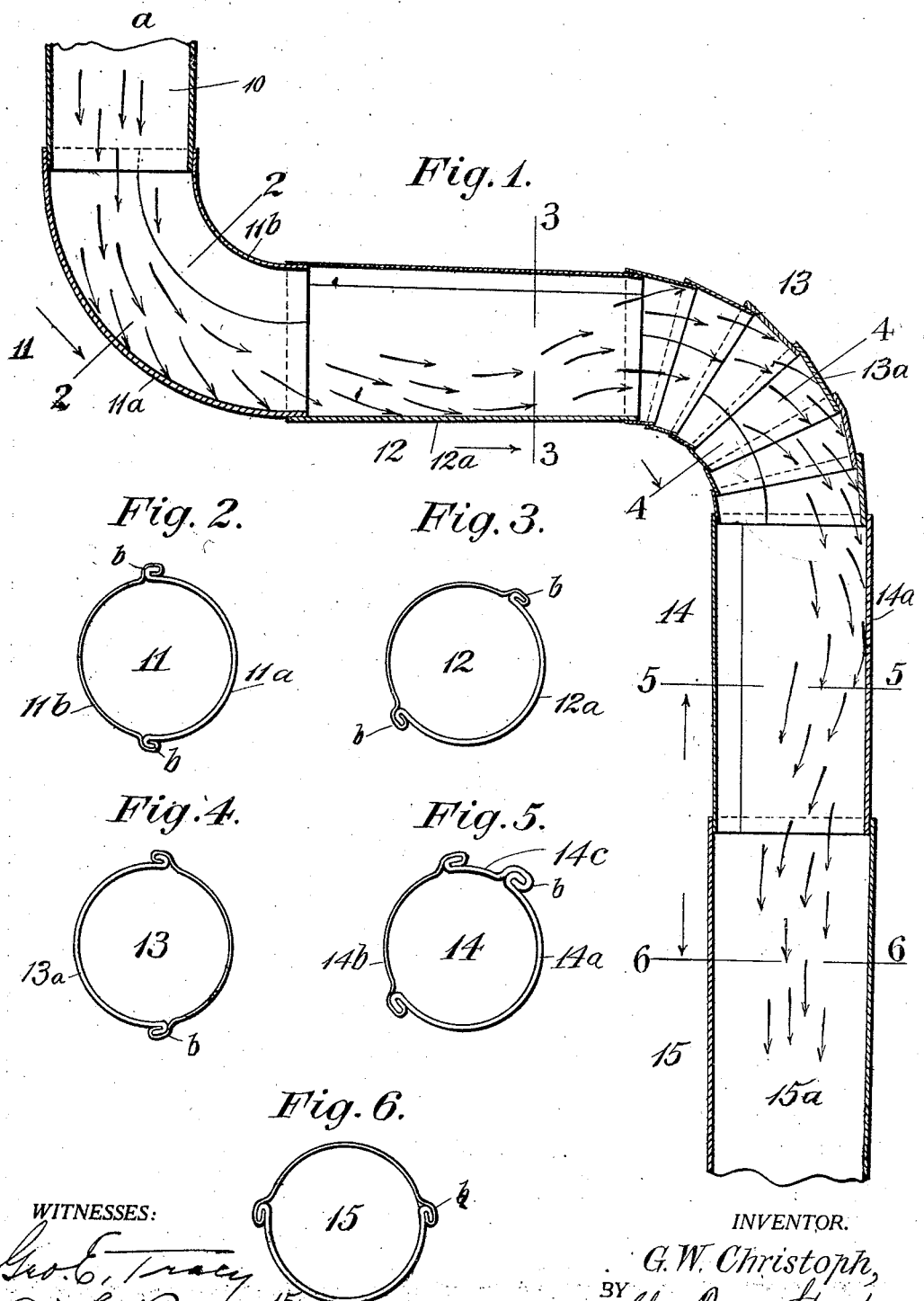

GEORGE W. CHRISTOPH, OF HARTFORD, CONNECTICUT, ASSIGNOR TO THE STERLING BLOWER & PIPE MFG. CO., OF HARTFORD, CONNECTICUT, A CORPORATION OF CONNECTICUT.

PIPING.

No. 906,106.  Specification of Letters Patent.  Patented Dec. 8, 1908.

Application filed July 24, 1907. Serial No. 385,306.

*To all whom it may concern:*

Be it known that I, GEORGE W. CHRISTOPH, a citizen of United States, and resident of Hartford, in the county of Hartford and State of Connecticut, have invented certain new and useful Improvements in Piping, of which the following is a full, clear, and exact specification.

This invention relates to the manufacture of sheet metal pipes and tubes, and more especially to that class thereof which are usually employed for conveying or carrying off material or substances some species of which may be of more or less gritty and abrasive nature, so that the inner surface of the pipe or tube is subjected to considerable wear. This wear manifests itself especially in tubes employed for carrying-off the "dust" from grinding and polishing machinery, this dust consisting of particles of emery and metal which are comparatively heavy and are generally passed through the pipes by a strong air current generated by an exhaust fan or blower. The inertia acquired by the dust is, therefore, considerable, and consequently the greatest wear will exist at the pipe-elbows, the construction of which is such as to afford extra "life" to that portion thereof which has the greatest wear.

Practice has demonstrated the advisability of making the elbows of thicker material than the straight pipe-sections, but under the regular system of manufacture, the entire elbow was made of this same extra-thick stock, and there was naturally a waste of material (at the unimportant portion) and also an increase in weight, which facts proved detrimental especially in pipes of larger diameters.

By my present invention, I am enabled to obviate these features entirely, inasmuch as I use stronger stock only on such portions of the conduit-pipe where the matter to be transported comes into contact therewith, while the other parts of the tubing can be made of any light and cheap material, as long as it serves to preserve the required form of tube.

My invention, therefore, has for one of its objects the provision of a conveyer-pipe or tube, each individual wear-receiving length of which is composed of a plurality of longitudinal "seamed" parts, the wear-part being preferably of a heavier stock than its co-active tube-forming part, although the several parts may be made of the same stock, so that when the wear-exposed portion of the conduit becomes unfit for use, only that particular part of the tube or elbow-section need be replaced, instead of providing an entirely new section.

My invention has been clearly illustrated in the accompanying drawings, in which similar characters denote similar parts, and in which Figure 1 represents a top view of a conduit built up of sections embodying my invention, and Figs. 2 to 6, inclusive, are cross sections, on lines 2—2, to 6—6, respectively of Fig. 1.

In forming conduit pipes, the several lengths are usually connected in conformity with the direction of the air-current passing through the same, so that each length telescopes for a short distance into the next succeeding one. In the drawing, the air current is supposed to enter into the conduit through the pipe length 10 at $a$, and the movement of the matter propelled by said current, is indicated by arrows. Hence we find that the outer portion $11^a$ of the elbow-length 11 will practically take all the wear, while the inner portion $11^b$ receives none.

In the succeeding straight-pipe length 12 the matter will rub along on the portion $12^a$, and be violently projected against the outer portion $13^a$ of the elbow length 13, then rub along the portion $14^a$ of the straight-pipe section 14 for a short distance and subsequently pass along over the bottom portion $15^a$ of the next pipe section 15, and so on.

From the foregoing it will be understood that, generally speaking, only a certain portion of each length sustains any actual wear while its other portion serves merely to maintain the tube-formation, these several co-acting portions being seamed together in the ordinary manner and substantially as shown at $b$.

Attention is called at this time to the constructions of the elbow-lengths 11, and 13, which differ from each other inasmuch as the last-named is built up in the usual manner and consists of a plurality of telescoped sections, each of which may consist of a thick wear-receiving portion and a thin tube-forming portion; while the elbow-length 11 comprises a unitary outer portion $11^a$ and a corresponding inner portion $11^b$, these portions being disposed in arcuate parallel and each consisting of a single piece of sheet metal shaped by dies or otherwise, so as to have the seams come on top or bottom, in which case the outer portion of the elbow will be circumferentially longer than the other (as shown), or the seams may come at diametrically-opposite sides, in which case both parts would be similar in size and shape.

While each individual pipe-length may be composed of a pair of seamed portions, occasion may demand a combination of three or more of such portions, as shown in Fig. 5, in which the pipe-length 14 consists of three portions: $14^a$, $14^b$, $14^c$.

By virtue of my present invention I am enabled to meet any desired condition in the formation of conduits, since under this organization the lengths can be formed of co- acting portions made of different materials, metallic or otherwise, at a low-cost of manufacture, and at a great saving in expense when compared with the usual or "uniform" type.

I claim:

1. A pipe-length consisting of a plurality of longitudinal parts semi-cylindrical in cross section and made of different metals seamed together at their longitudinal edges.

2. A curved pipe length or elbow consisting of a pair of co-acting parts disposed in arcuate parallelism and united at their longitudinal edges, the outer part being made of stock different from that of the inner part.

GEORGE W. CHRISTOPH.

Witnesses:
CHAS. F. SCHMELZ,
GEO. E. FRAY.